United States Patent
Yanagi

(10) Patent No.: US 10,587,803 B2
(45) Date of Patent: Mar. 10, 2020

(54) IMAGING APPARATUS, IMAGING MODE CONTROL METHOD AND STORAGE MEDIUM

(71) Applicant: CASIO COMPUTER CO., LTD., Shibuya-ku, Tokyo (JP)

(72) Inventor: Kazunori Yanagi, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 9 days.

(21) Appl. No.: 15/654,194

(22) Filed: Jul. 19, 2017

(65) Prior Publication Data

US 2018/0041701 A1    Feb. 8, 2018

(30) Foreign Application Priority Data

Aug. 2, 2016    (JP) ................................. 2016-151722

(51) Int. Cl.
H04N 5/232    (2006.01)
H04W 4/80    (2018.01)

(52) U.S. Cl.
CPC ......... *H04N 5/23245* (2013.01); *H04N 5/232* (2013.01); *H04N 5/2327* (2013.01); *H04N 5/23203* (2013.01); *H04N 5/23206* (2013.01); *H04N 5/23258* (2013.01); *H04W 4/80* (2018.02)

(58) Field of Classification Search
CPC .. H04N 5/232; H04N 5/2327; H04N 5/23245; H04N 5/23258; H04N 5/23206; H04N 5/23203; H04W 4/80
See application file for complete search history.

(56) References Cited

U.S. PATENT DOCUMENTS

| | | | |
|---|---|---|---|
| 8,994,783 B2 | 3/2015 | Ino | |
| 10,084,952 B2* | 9/2018 | Matsuda | ............ H04N 5/23216 |
| 2012/0133730 A1 | 5/2012 | Ino | |
| 2014/0354832 A1* | 12/2014 | Iwamoto | ............ H04N 5/23203 348/207.11 |
| 2015/0381886 A1 | 12/2015 | Kato et al. | |

(Continued)

FOREIGN PATENT DOCUMENTS

| | | |
|---|---|---|
| CN | 201127061 Y | 10/2008 |
| CN | 102333202 A | 1/2012 |

(Continued)

OTHER PUBLICATIONS

Ohinese Office Action dated Aug. 5, 2019 (and English translation thereof) issued in Chinese Application No. 201710649776.X.

*Primary Examiner* — Ngoc Yen T Vu
(74) *Attorney, Agent, or Firm* — Holtz, Holtz & Volek PC

(57) ABSTRACT

A still image mode for recording still images or a moving image mode for recording moving images is sequentially judged as to whether or not communication with a remote control device has been disconnected (wireless connection status). When the disconnection of the communication with the remote control device is detected, the current imaging mode is automatically switched to an interval imaging mode with its base imaging mode such as a still image mode or a moving image mode being maintained. During the disconnection period, that is, until the re-establishment of the communication is detected, an operation of recording a still image or a moving image is repeated at predetermined time intervals.

15 Claims, 14 Drawing Sheets

T1

| IMAGING MODE (CONNECTED STATE) | IMAGING MODE (DISCONNECTED STATE) |
|---|---|
| NORMAL IMAGING MODE (STILL IMAGE) | INTERVAL IMAGING MODE (STILL IMAGE) (IMAGING INTERVALS: DEFAULT) |
| NORMAL IMAGING MODE (MOVING IMAGE) | INTERVAL IMAGING MODE (MOVING IMAGE) (IMAGING INTERVALS: DEFAULT) |
| INTERVAL IMAGING MODE (STILL IMAGE) | INTERVAL IMAGING MODE (STILL IMAGE) (IMAGING INTERVALS: LONGEST) |
| INTERVAL IMAGING MODE (MOVING IMAGE) | INTERVAL IMAGING MODE (STILL IMAGE) |

(56) References Cited

U.S. PATENT DOCUMENTS

2018/0020407 A1* 1/2018 Emmanuel ........ H04W 52/0229
2019/0052794 A1* 2/2019 Kikuchi ........... H04N 5/232411

FOREIGN PATENT DOCUMENTS

| CN | 102572238 A | 7/2012 | | |
|----|-------------|--------|---|---|
| CN | 105306807 A | 2/2016 | | |
| JP | 2004-104370 | * | 2/2004 | ............... H04N 7/18 |
| JP | 2004104369 A | 4/2004 | | |

* cited by examiner

FIG. 3

| IMAGING MODE (CONNECTED STATE) | IMAGING MODE (DISCONNECTED STATE) |
|---|---|
| NORMAL IMAGING MODE (STILL IMAGE) | INTERVAL IMAGING MODE (STILL IMAGE) (IMAGING INTERVALS: DEFAULT) |
| NORMAL IMAGING MODE (MOVING IMAGE) | INTERVAL IMAGING MODE (MOVING IMAGE) (IMAGING INTERVALS: DEFAULT) |
| INTERVAL IMAGING MODE (STILL IMAGE) | INTERVAL IMAGING MODE (STILL IMAGE) (IMAGING INTERVALS: LONGEST) |
| INTERVAL IMAGING MODE (MOVING IMAGE) | INTERVAL IMAGING MODE (STILL IMAGE) |

| IMAGING MODE (CONNECTED STATE) | IMAGING MODE (DISCONNECTED STATE) | |
|---|---|---|
| | GRAVITY DIRECTION AND OPTICAL AXIS DIRECTION COINCIDE WITH EACH OTHER | GRAVITY DIRECTION AND OPTICAL AXIS DIRECTION ARE OPPOSITE TO EACH OTHER | GRAVITY DIRECTION AND OPTICAL AXIS DIRECTION DO NOT COINCIDE WITH EACH OTHER (EXCLUDING THAT DIRECTIONS ARE OPPOSITE TO EACH OTHER) |
| NORMAL IMAGING MODE (STILL IMAGE, MOVING IMAGE) | TURN POWER SUPPLY OFF | INTERVAL IMAGING MODE (STILL IMAGE) (IMAGING INTERVALS: DEFAULT) | INTERVAL IMAGING MODE (MOVING IMAGE) (IMAGING INTERVALS: DEFAULT) |
| INTERVAL IMAGING MODE (STILL IMAGE) | TURN POWER SUPPLY OFF | INTERVAL IMAGING MODE (STILL IMAGE) (IMAGING INTERVALS: LONGEST) | INTERVAL IMAGING MODE (STILL IMAGE) |
| INTERVAL IMAGING MODE (MOVING IMAGE) | TURN POWER SUPPLY OFF | INTERVAL IMAGING MODE (MOVING IMAGE) (IMAGING INTERVALS: LONGEST) | INTERVAL IMAGING MODE (MOVING IMAGE) |

FIG. 9

| IMAGING MODE (CONNECTED STATE) | IMAGING MODE (DISCONNECTED STATE) | |
|---|---|---|
| | BRIGHTNESS IS SMALLER THAN PREDETERMINED VALUE | BRIGHTNESS IS EQUAL TO OR LARGER THAN PREDETERMINED VALUE |
| NORMAL IMAGING MODE (STILL IMAGE, MOVING IMAGE) | TURN POWER SUPPLY OFF | INTERVAL IMAGING MODE (STILL IMAGE, MOVING IMAGE) (IMAGING INTERVALS: DEFAULT) |
| INTERVAL IMAGING MODE (STILL IMAGE) | TURN POWER SUPPLY OFF | INTERVAL IMAGING MODE (STILL IMAGE) (IMAGING INTERVALS: LONGEST) |
| INTERVAL IMAGING MODE (MOVING IMAGE) | TURN POWER SUPPLY OFF | INTERVAL IMAGING MODE (MOVING IMAGE) (IMAGING INTERVALS: LONGEST) |

FIG. 12

| IMAGING MODE (CONNECTED STATE) | IMAGING MODE (DISCONNECTED STATE) | |
|---|---|---|
| | ACCELERATION IS SMALLER THAN THRESHOLD | ACCELERATION IS EQUAL TO OR LARGER THAN THRESHOLD |
| NORMAL IMAGING MODE (STILL IMAGE, MOVING IMAGE) | INTERVAL IMAGING MODE (STILL IMAGE) (IMAGING INTERVALS: DEFAULT) | INTERVAL IMAGING MODE (MOVING IMAGE) (IMAGING INTERVALS: DEFAULT, BLUR CORRECTION LEVEL: MAXIMUM) |
| INTERVAL IMAGING MODE (STILL IMAGE) | INTERVAL IMAGING MODE (STILL IMAGE) (IMAGING INTERVALS: LONGEST) | INTERVAL IMAGING MODE (STILL IMAGE) (IMAGING INTERVALS: DEFAULT, BLUR CORRECTION LEVEL: MAXIMUM) |
| INTERVAL IMAGING MODE (MOVING IMAGE) | INTERVAL IMAGING MODE (MOVING IMAGE) (IMAGING INTERVALS: LONGEST) | INTERVAL IMAGING MODE (MOVING IMAGE) (IMAGING INTERVALS: DEFAULT, BLUR CORRECTION LEVEL: MAXIMUM) |

T4

IMAGING APPARATUS, IMAGING MODE CONTROL METHOD AND STORAGE MEDIUM

CROSS-REFERENCE TO RELATED APPLICATION

This application is based upon and claims the benefit of priority from the prior Japanese Patent Application No. 2016-151722, filed Aug. 2, 2016, the entire contents of which are incorporated herein by reference.

BACKGROUND OF THE INVENTION

1. Field of the Invention

The present invention relates to an imaging apparatus, an imaging mode control method and a storage medium.

2. Description of the Related Art

Conventionally, techniques for wirelessly controlling a digital still camera in a remote location by a PC (Personal Computer) have been conceived. For example, Japanese Patent Application Laid-Open (Kokai) Publication No. 2004-104369 discloses a technique in which a PC performs imaging control over a camera by remote control via Bluetooth (registered trademark) and an image currently captured by the camera is transmitted to the PC.

SUMMARY OF THE INVENTION

In accordance with one aspect of the present invention, there is provided an imaging apparatus comprising: an imaging section; a judgment section which judges whether control over the imaging section by wireless connection with a remote control device has been maintained; and a control section which, in a first imaging mode set as an imaging mode for image capturing by the imaging section, sets a second imaging mode different from the first imaging mode as the imaging mode in response to a judgment made by the judgment section that the control over the imaging section has not been maintained.

In accordance with another aspect of the present invention, there is provided an imaging mode control method comprising: a step of judging whether control over an imaging section by wireless connection with a remote control device has been maintained; and a step of setting, in a first imaging mode set as an imaging mode for image capturing by the imaging section, a second imaging mode different from the first imaging mode as the imaging mode, in response to a judgment that the control over the imaging section has not been maintained.

In accordance with another aspect of the present invention, there is provided a non-transitory computer-readable storage medium having a program stored thereon that is executable by a computer in an imaging apparatus to actualize functions comprising: judgment processing for judging whether control over an imaging section by wireless connection with a remote control device has been maintained; and control processing for setting, in a first imaging mode set as an imaging mode for image capturing by the imaging section, a second imaging mode different from the first imaging mode as the imaging mode, in response to a judgment made by the judgment processing that the control over the imaging section has not been maintained.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a conceptual diagram showing a control table in a first embodiment;

FIG. 6 is a conceptual diagram showing a control table in a second embodiment;

FIG. 9 is a conceptual diagram showing a control table in a third embodiment;

FIG. 12 is a conceptual diagram showing a control table in a fourth embodiment;

DETAILED DESCRIPTION OF THE PREFERRED EMBODIMENTS

Embodiments of the present invention will hereinafter be described.

First Embodiment

Figure 1:
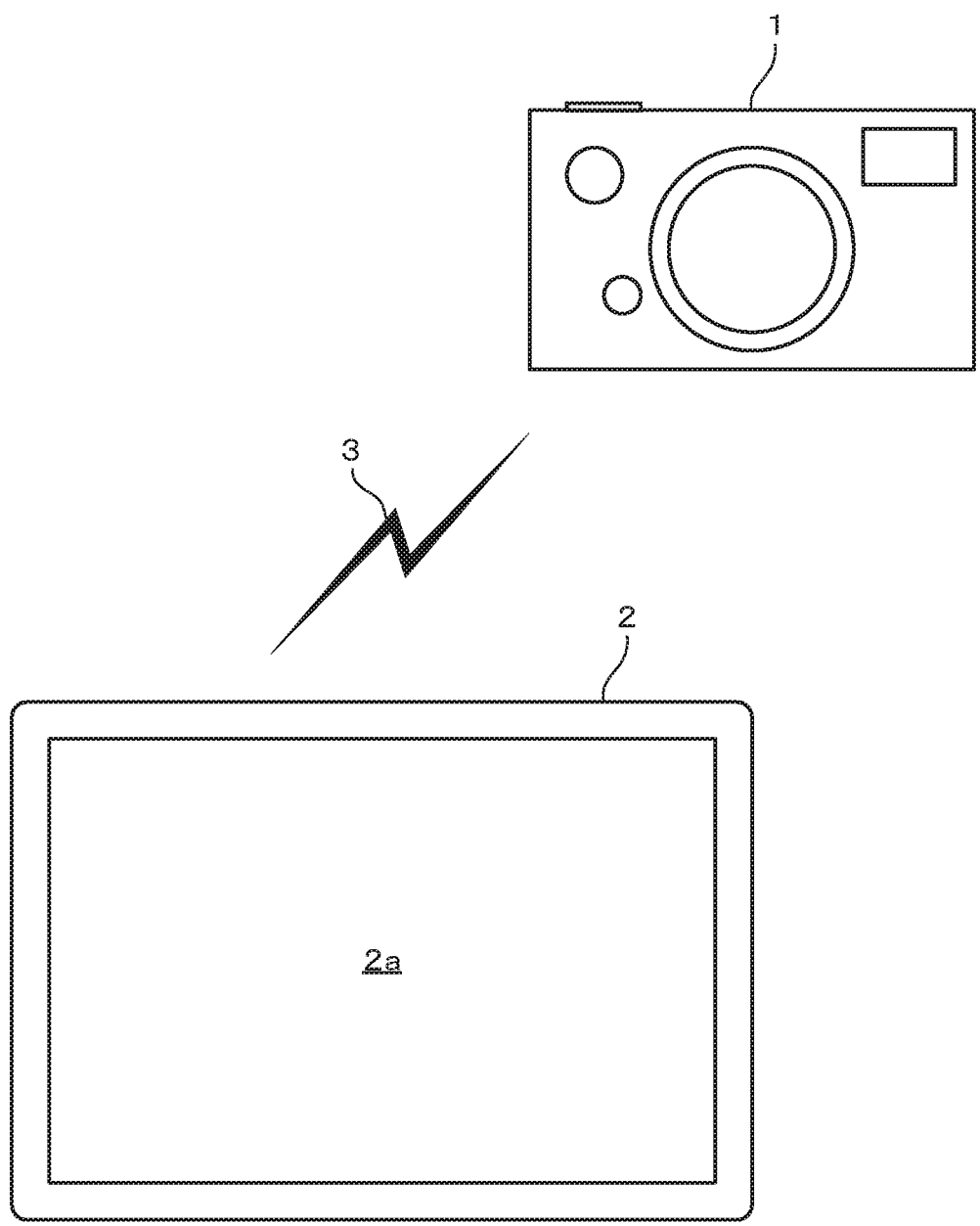
FIG. 1 is a system structural diagram showing the structure of a remote operation system constituted by a digital camera and a remote controller, which is common to respective embodiments of the present invention.

FIG. 1 is a system structural diagram showing the structure of a remote operation system constituted by a digital camera 1 and a remote controller 2 in a first embodiment of the present invention, which is common to other embodiments described below. The digital camera 1 in FIG. 1 includes imaging means, and is structured to be limited to the recording of images (still images/moving images) captured by this imaging means. On the other hand, the remote controller 2 is an external device having a display section 2a, and is actualized by a smartphone, tablet terminal, or the like. The digital camera 1 and the remote controller 2 herein achieve pairing (wireless connection recognition) by using wireless communication 3 which is usable by each of the digital camera 1 and the remote controller 2. This remote controller 2 remotely operates the activated digital camera 1 via the wireless communication 3 by using a camera-operation-dedicated application (program).

The remote control in the present invention includes starting and stopping operations for still image/moving image capturing, operation mode setting, zooming, imaging condition setting, captured image (captured moving image) viewing, and the like. Also, the wireless communication 3 in FIG. 1 is achieved by a communication method based on, for example, Wi-Fi (Wireless Fidelity: registered trademark) technology that applies the International Standard IEEE-802.11 series or Bluetooth (registered trademark) technology (including Bluetooth (registered trademark) low energy technology). The digital camera 1 may have a general shape allowing it to be hand-held or fixed to a tripod or the like, or may have a shape and a structure allowing it to be wearable to a human body.

Figure 2:
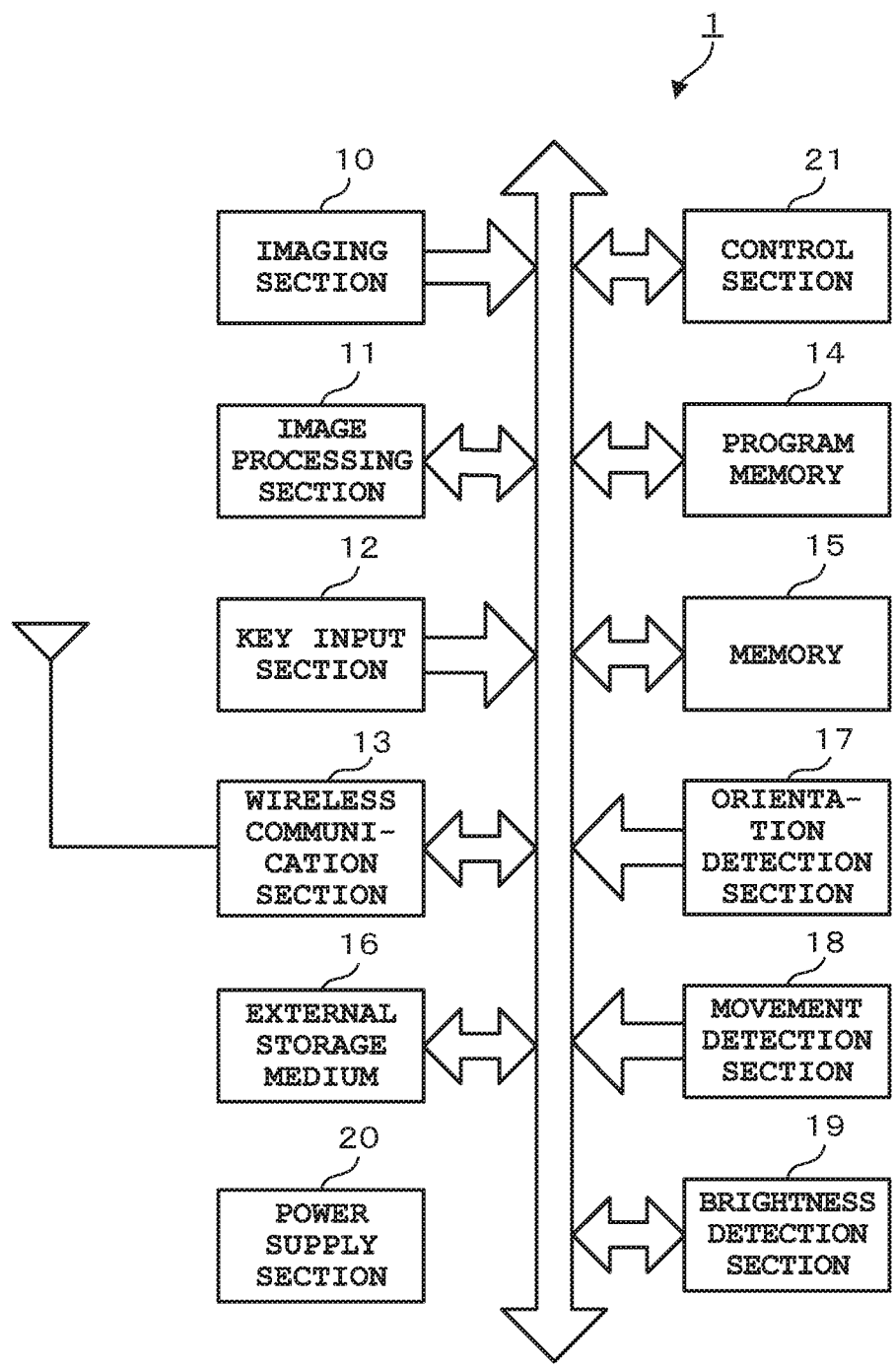
FIG. 2 is a block diagram of the digital camera common to the respective embodiments.

FIG. 2 is a block diagram showing the structure of the digital camera 1 common to the first embodiment and the other embodiments of the present invention. This digital camera 1 includes an imaging section 10, an image processing section 11, a key input section 12, a wireless communication section 13, a program memory 14, a memory 15, an external storage medium 16, an orientation detection section 17, a movement detection section 18, a brightness detection section 19, a power supply section 20, and a control section 21.

The imaging section 10 includes a lens block formed of an optical lens group and an image sensor such as a CMOS (Complementary Metal Oxide Semiconductor) or a CCD (Charge Coupled Device), and converts an image entering from the lens block to a digital signal (imaging signal) by the image sensor for output. The image processing section 11 performs image processing (such as pixel interpolation processing, γ correction, generation of a luminance color-difference signal, white balance processing, exposure correction processing, superimposing and combining processing, and filtering processing) on image data formed of the digital imaging signal outputted from the imaging section 10; performs compression and expansion processing on the image data (for example, compression and expansion of a JPEG (Joint Photographic Experts Group) format, Motion-JPEG format, or MPEG (Moving Picture Experts Group) format), and performs processing such as trimming and digital zooming of the captured image.

The key input section 12 includes a plurality of operation keys such as a shutter key, a zoom key, a mode key, a movie recording start/end key, and a power supply ON/OFF key, and outputs an operation signal in accordance with the user's key operation. The wireless communication section 13 transmits and receives still-image data/moving-image data and the like to and from an external device (for example, an electronic device including a display section, such as a smartphone or tablet terminal) in accordance with the communication protocol of, for example, Bluetooth (registered trademark). Note that the transmitting/receiving operation of the wireless communication section 13 should more preferably be performed using power-saving Bluetooth (registered trademark) Low Energy or Bluetooth (registered trademark) @Smart. Also, in addition to the wireless communication section 13 based on Bluetooth (registered trademark), communication means using a wireless LAN (Local Area Network), NFC (Near Field Communication), or a mobile communication network for portable phones may be included.

The program memory 14 has stored therein various programs for causing the control section 21 described below to control each section of the digital camera 1 and various parameters required for such control. The memory 15 is used as a buffer memory for temporarily storing still image data and moving image data captured by the imaging section 10, and is also used as a working memory when the control section 21 executes a program. The external storage medium 16 is formed of a storage medium such as a micro SD (Secure Digital) card or a SD card, and stores still image files in JPEG format and moving image files in M-JPEG format or MPEG format.

The orientation detection section 17 detects the gravity direction by a gravity sensor when necessary, and supplies the detection result to the control section 21 as orientation information indicating the orientation of the main body of the digital camera 1. The movement detection section 18 detects accelerations in triaxial directions by an acceleration sensor or gyro sensor when necessary, and supplies the detection result to the control section 21. The brightness detection section 19 detects, when necessary, the brightness of a surrounding environment based on an image signal outputted from the imaging section 10, and supplies the detection result to the control section 21. The power supply section 20 is constituted by a battery charger that is a power supply, an AC/DC converter, and the like, and supplies electric power required for operation to each section of the digital camera 1. In addition, the power supply section 20 sequentially detects a power supply voltage (operating voltage) and supplies the detection result to the control section 21.

The control section 21 controls the operation of each section by executing a program stored in the program memory 14 described above. In particular, in the present embodiment, the control section 21 sequentially monitors for the status of connection with the remote controller 2 while the digital camera 1 is performing image capturing by remote control by the remote controller 2 and, when judged that the communication with the remote controller 2 has been disconnected and imaging control by remote operation cannot be maintained, performs processing of switching the current imaging mode and the like.

Also, in the program memory 14, a control table is stored which defines details of the processing of switching the current imaging mode and the like in the control section 21. FIG. 3 is a conceptual diagram showing this control table T1. This control table T1 is a table indicating each relation between a set imaging mode when the digital camera 1 is wirelessly connected to the remote controller 2 and an imaging mode to which the set imaging mode is switched when communication with the remote controller 2 is disconnected, and their detailed operation contents.

Here, imaging modes provided to the digital camera 1 are described. The digital camera 1 is provided with a still image mode for recording still images and a moving image mode for recording moving images as base imaging modes. Furthermore, as a subordinate mode of the still image mode and the moving image mode, an interval imaging mode is provided for automatically recording still images or moving images at constant time intervals without detecting any imaging (recording) instruction given from the remote controller 2 by remote operation.

In the following descriptions, the still image mode and the moving image mode when the interval imaging mode has not been set are collectively referred to as a normal imaging mode, and image capturing in that imaging mode is referred to as normal imaging. Also, the still image mode and the moving image mode when the interval imaging mode has been set are collectively referred to as an interval imaging mode, and image capturing in that imaging mode is referred to as interval imaging. Note that imaging intervals for this interval imaging can be set by the user selecting in advance from among a plurality of candidates or can be arbitrarily set.

As shown in FIG. 3, when communication with the remote controller 2 is disconnected, the currently set imaging mode is switched to the interval imaging mode in any cases. This interval imaging mode is basically the same as the imaging mode (still image mode or moving image mode) that had been used before the communication has been disconnected, but its imaging intervals are different therefrom.

Figure 4:
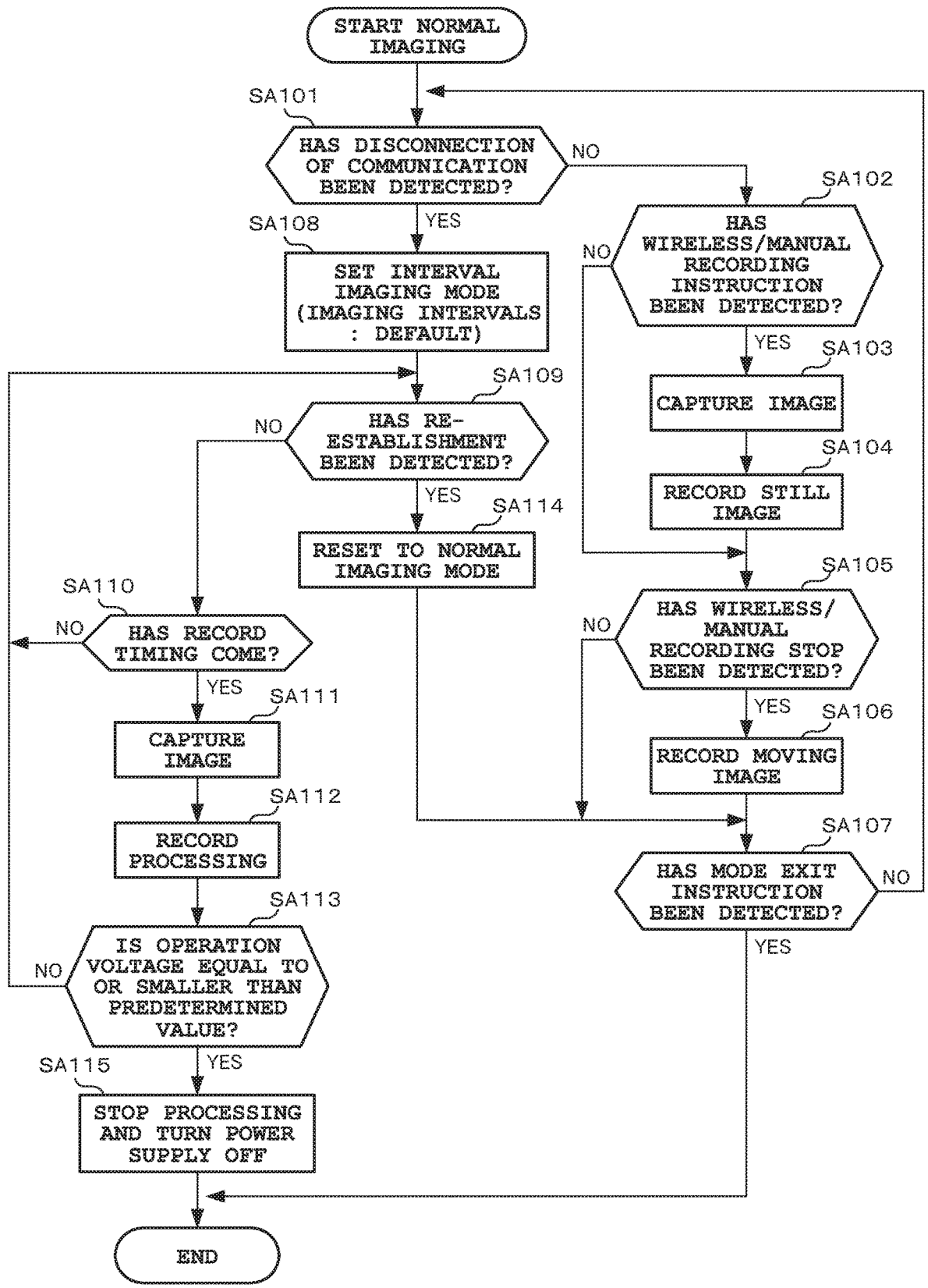
FIG. 4 is a flowchart for describing the operation of the digital camera in a normal imaging mode in the first embodiment.
Figure 5:
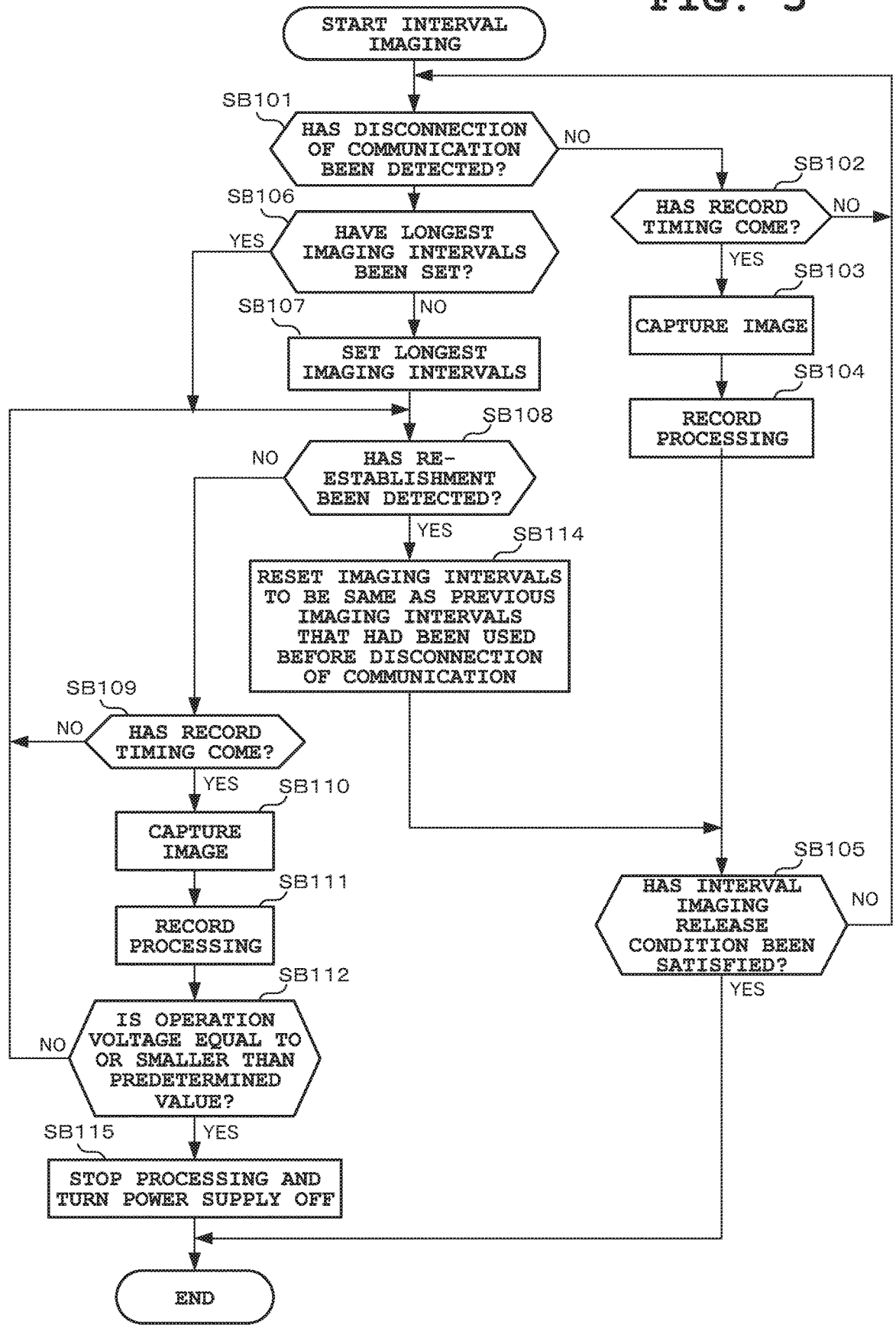
FIG. 5 is a flowchart for describing the operation of the digital camera in an interval imaging mode in the first embodiment.

Hereafter, the operation of the present embodiment is described according to FIG. 4 and FIG. 5. FIG. 4 and FIG. 5 are flowcharts for describing the operation of the digital camera 1, which show processing that is performed by the control section 21 when wireless connection with the remote controller 2 is established after the power supply is turned ON and an arbitrary imaging mode is set by the user.

First, the operation of the digital camera 1 when the normal imaging mode is set by the user is described according to FIG. 4. When the normal imaging mode is set and the operation is started, the control section 21 immediately starts processing of sequentially detecting whether communication with the remote controller 2 has been disconnected. Then, while the disconnection of the communication is not detected, that is, while being wirelessly connected (NO at Step SA101), the control section 21 performs the following processing.

When being wirelessly connected (here, during normal imaging), the control section 21 sequentially judges whether or not a recording instruction has been wirelessly provided by the remote controller 2 or whether or not a recording instruction has been provided manually (by the operation of the shutter key) (Step SA102). When judged that a recording instruction has been provided (YES at Step SA102), the control section 21 causes the imaging section 10 to perform image capturing (Step SA103), and performs record processing of compressing and recording the captured image data (Step SA104). Although omitted in the drawing, when the normal imaging mode herein is a moving image mode, the image capture processing at Step SA103 is to start image capturing at a predetermined frame rate, and the record processing at Step SA104 is to start the recording of each frame image.

Also, during the wireless connection, the control section 21 sequentially judges whether or not a recording stop instruction has been wirelessly provided by the remote controller 2 or whether or not a recording stop instruction has been provided manually (by the operation of the shutter key) (Step SA105). Note that, although omitted in the drawing, this processing is skipped when the normal imaging mode herein is a still image mode.

Then, when judged that a recording stop instruction has been provided (YES at Step SA105), the control section 21 ends the image record processing that has been performed at the predetermined frame rate, and performs final moving-image record processing, that is, processing of generating a moving image file, and completes one cycle of moving image capturing (Step SA106).

Furthermore, during the wireless connection, the control section 21 sequentially judges whether or not a mode exit instruction has been detected, that is, judges whether or not an instruction to switch the current imaging mode has been wirelessly provided by the remote controller 2 or manually provided from the user (Step SA107). Then, when judged that a mode exit instruction has not been detected (NO at Step SA107), the control section 21 returns to the processing at Step SA101 and repeats the processing at Step SA101 and the following steps. When judged that a mode exit instruction has been detected during the wireless connection (YES at Step SA107), the control section 21 instantly ends the processing of the normal imaging mode.

On the other hand, when the disconnection of the communication is detected (YES at Step SA101) before a mode exit instruction is detected (NO at Step SA107), the control section 21 performs the following processing.

First, based on the control table T1 (FIG. 3), the control section 21 automatically switches the normal imaging mode to the interval imaging mode while maintaining its base imaging mode (still image mode or moving image mode), and sets imaging intervals therefor at a default value (Step SA108). Note that the default value herein is an initial value set in advance for the interval imaging mode.

Then, the control section 21 starts processing of sequentially detecting whether the communication with the remote controller 2 has been re-established. Here, until the re-establishment of the communication is detected (NO at Step SA109), that is, in interval imaging during the disconnection period, the control section 21 performs the following processing.

During the disconnection period, the control section 21 sequentially judges whether record timing has come (Step SA110). Here, when the base imaging mode is a still image mode, the imaging intervals set at Step SA108 serve as the record timing. When the base imaging mode is a moving image mode, frame timing during moving image capturing that is intermittently performed at the imaging intervals set at Step SA108 serves as the record timing.

Then, when judged that the record timing has come (YES at Step SA110), the control section 21 causes the imaging section 10 to perform image capturing (Step SA111), and performs record processing of compressing and recording the captured image data (Step SA112).

Also, the control section 21 judges whether the operation voltage is equal to or smaller than a predetermined value set in advance, and returns to the processing at Step SA109 so as to repeat the processing at Step SA109 and the following steps unless the operation voltage is equal to or smaller than the predetermined value (NO at Step SA113). As a result, during the disconnection period, the control section 21 repeats still image capturing or moving image capturing at the defined time intervals programmed in advance.

During this image capturing, when the re-establishment of the communication is detected (YES at Step SA109) before the operation voltage becomes equal to or smaller than the predetermined value (NO at Step SA113), the control section 21 automatically resets the current imaging mode to be the normal imaging mode (Step SA114).

Thereafter, the control section 21 returns to the processing at Step SA107 and repeats the processing at Steps SA101 to SA106 until a mode exit instruction is detected (NO at Step SA107). That is, the control section 21 waits for a recording instruction wirelessly provided by the remote controller 2 or provided manually (by the operation of the shutter key), and then performs still image capturing or moving image capturing in response to the recording instruction.

On the other hand, when the operation voltage becomes equal to or smaller than the predetermined value during the disconnection period, or in other words, while the interval imaging is being performed (YES at Step SA113), the control section 21 immediately performs stop processing and turns off the power supply (Step SA115) to end the entire processing. Note that this stop processing is processing required to be performed before the power supply is turned off, and includes the generation of a moving image file in a case where moving image capturing is being performed.

As described above, when communication with the remote controller 2 is disconnected while normal imaging is being performed, and imaging control by remote control becomes unable to be maintained, the current imaging mode of the digital camera 1 is automatically switched to the interval imaging mode, and interval imaging in the still image mode or the moving image mode at defined imaging intervals is performed. As a result of this configuration, even when interference occurs in wireless remote control, still images or moving images can be continuously recorded. Thus, effects on image capturing when interference occurs in wireless remote control can be reduced.

Next, the operation of the digital camera 1 when the interval imaging mode is set by the user is described according to FIG. 5. When the interval imaging mode is set and the operation is started, the control section 21 immediately starts processing of sequentially detecting whether communication with the remote controller 2 has been disconnected. Then, while the disconnection of the communication is not detected, that is, while being wirelessly connected (NO at Step SB101), the control section 21 performs the following processing.

When being wirelessly connected (here, during interval imaging), the control section 21 counts the time elapsed time from the start of the operation. Then, based on the elapsed time and imaging intervals set by the user, the control section 21 sequentially judges whether record timing that occurs at predetermined time intervals has come (Step SB102). Note that, when the interval imaging mode herein is a moving image mode, frame timing during moving image capturing that is intermittently performed at the imaging intervals set by the user serves as the record timing.

Then, when judged that the record timing has come (YES at Step SB102), the control section 21 causes the imaging section 10 to perform image capturing (Step SB103), and performs record processing of compressing and recording the captured image data (Step SB104).

Subsequently, the control section 21 judges whether an interval imaging release condition has been satisfied (Step SB105). The interval imaging release condition herein is a condition for ending the interval imaging. For example, it is ended on condition that the time elapsed from the start of the interval imaging has reached a predetermined time set in advance or a time set by the user, or that the remaining memory amount of the external recording medium 16 is equal to or smaller than a predetermined value. Note that the interval imaging release condition includes the detection of an imaging end instruction provided manually from the user or by the remote controller 2 and the detection of an imaging mode switching instruction.

Here, when judged that the interval imaging release condition has not yet been satisfied (NO at Step SB105), the control section 21 returns to the processing at Step SB101 to repeat the processing at Step SB101 and the following steps, or in other words, continues the interval imaging. Then, when judged that the interval imaging release condition has been satisfied during the interval imaging (YES at Step SB105), the control section 21 ends the processing of the interval imaging mode at this point.

On the other hand, when the disconnection of the communication is detected (YES at Step SB101) before the interval imaging release condition is satisfied (NO at Step SB105), the control section 21 performs the following processing.

First, based on the control table T1 (FIG. 3), the control section 21 judges whether the longest imaging intervals have been set as the current imaging intervals for the interval imaging, that is, whether the imaging intervals arbitrary set or selected by the user have the longest settable time (Step SB106). Here, when judged that the longest imaging intervals have not been set (NO at Step SB106), the control section 21 sets the longest imaging intervals (Step SB107). When judged that the longest imaging intervals have been set (YES at Step SB106), the control section 21 maintains this setting without performing any operation.

Then, the control section 21 starts processing of sequentially detecting whether the communication with the remote controller 2 has been re-established, and performs the following processing until the re-establishment of the communication is detected (NO at Step SB108), that is, during the disconnection period.

During the disconnection period, the control section 21 sequentially judges whether record timing has come (Step SB109). Note that, when the interval imaging mode herein is a still image mode, timing when the time elapsed from the immediately preceding image capturing has reached the longest settable time serves as the record timing. When the interval imaging mode herein is a moving image mode, frame timing during moving image capturing that is intermittently performed at the longest imaging intervals serves as the record timing.

Then, when judged that the record timing has come (YES at Step SB109), the control section 21 causes the imaging section 10 to perform image capturing (Step SB110), and performs record processing of compressing and recording the captured image data (Step SB111).

Also, the control section 21 judges whether the operation voltage is equal to or smaller than a predetermined value set in advance, and returns to the processing at Step SB108 so as to repeat the processing at Step SB108 and the following steps unless the operation voltage is equal to or smaller than the predetermined value (NO at Step SB112). As a result, during the disconnection period, the control section 21 repeats still image capturing or moving image capturing at the longest settable imaging intervals.

During this image capturing, when the re-establishment of the communication is detected (YES at Step SB108) before the operation voltage becomes equal to or smaller than the predetermined value (NO at Step SB112), the control section 21 resets the current imaging intervals to be the same as the previous imaging intervals that had been used before the disconnection of the communication (Step SB114). That is, the control section 21 changes the current imaging intervals back to the previous imaging intervals arbitrarily set or selected by the user.

Thereafter, the control section 21 returns to the processing at Step SB105 and repeats the processing at Steps SB101 to SB105 until the interval imaging release condition is satisfied (NO at Step SB105). That is, the control section 21 performs interval imaging (still image capturing or moving image capturing) at the imaging intervals arbitrarily set or selected by the user.

At Step SB112, when the operation voltage becomes equal to or smaller than the predetermined value while the interval imaging is being performed at the longest imaging intervals during the disconnection period, (YES at Step SB112), the control section 21 immediately performs stop processing and turns off the power supply (Step SB115) to end the entire processing. In this case as well, the stop processing is processing required be performed before the power supply is turned off, and includes the generation of a moving image file in a case where moving image capturing is being performed.

As described above, when communication with the remote controller 2 is disconnected while interval imaging is being performed, and whereby remote operation by the remote controller 2 is disabled, the digital camera 1 automatically switches the current imaging intervals to the longest settable imaging intervals, and then continues the interval imaging in the still image mode or the moving image mode at the longest imaging intervals. As a result of this configuration, even when interference occurs in wireless remote control, still images or moving images can be continuously recorded. Thus, effects on image capturing when interference occurs in wireless remote control can be reduced. Also, by imaging intervals being switched to the longest settable imaging intervals, a time period where still images or moving images are continuously recordable can be prolonged.

Second Embodiment

Next, a second embodiment of the present invention is described. In the present embodiment, in the digital camera 1 shown in FIG. 1 and FIG. 2, a control table T2 shown in FIG. 6 has been stored in the program memory 14 in place of the above-described control table T1 of FIG. 3.

FIG. 6 is a conceptual diagram similar to that of FIG. 3. The control table T2 of the present embodiment is also a table indicating each relation between a set imaging mode when the digital camera 1 is wirelessly connected to the remote controller 2 and an imaging mode to which the set imaging mode is switched when communication with the remote controller 2 is disconnected, and their detailed operation contents. However, the imaging modes herein to which the set imaging modes are switched and their detailed operation contents are different from those of the first embodiment. Here, an imaging mode to which a set imaging mode is switched and its detailed operation content vary based on a relation between the gravity direction detected by the orientation detection section 17 and an optical axis direction. That is, they vary based on whether both directions coincide with each other, whether the directions are opposite to each other, and whether the directions are different from each other (excluding that the directions are opposite to each other). Here, the optical axis direction is an imaging direction (the orientation of image capturing) along the optical axis of the lens block in the imaging section 10.

Figure 7:
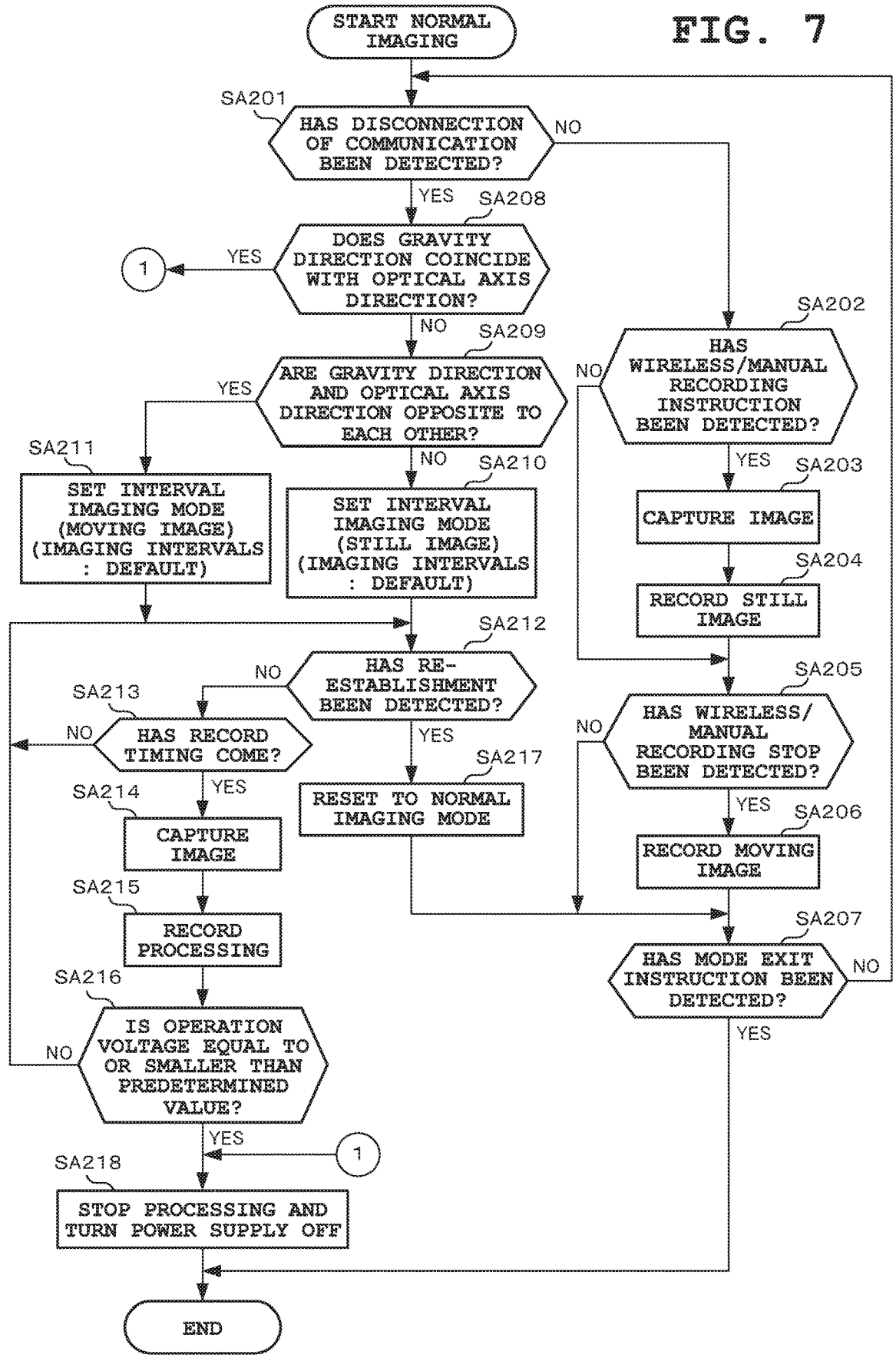
FIG. 7 is a flowchart for describing the operation of the digital camera in a normal imaging mode in the second embodiment.

In the present embodiment, when the normal imaging mode is set by the user after the power supply is turned ON and wireless connection with the remote controller 2 is established, the control section 21 performs processing shown in FIG. 7. When the interval imaging mode is set by the user, the control section 21 performs processing shown in FIG. 8. This second embodiment is different from the first embodiment in that, when communication with the remote controller 2 is disconnected, the control section 21 automatically switches the current imaging mode based on the orientation of the digital camera 1.

First, the processing by the control section 21 when the normal imaging mode is set by the user is described according to FIG. 7. Note that, as is obvious from the drawing, the basic processing is similar to that of the first embodiment shown in FIG. 4, and therefore explanations thereof are omitted. Here, only processing different from that of the first embodiment is mainly described.

In the present embodiment, after the normal imaging mode is set and the operation is started, when the disconnection of communication with the remote controller 2 is detected (YES at Step SA201), the control section 21 judges whether the gravity direction detected by the orientation detection section 17 coincides with the current optical axis direction (imaging direction) (Step SA208). In this processing, the control section 21 judges that the gravity direction coincides with the optical axis direction when the difference therebetween is equal to or smaller than a predetermined threshold.

Then, when judged that the gravity direction does not coincide with the optical axis direction (NO at Step SA208), the control section 21 further judges whether the gravity direction and the optical axis direction are opposite to each other (Step SA209). In this processing, the control section 21 judges that the directions are opposite to each other when the angular difference between the optical axis direction and the direction completely opposite to the gravity direction is equal to or smaller than a predetermined threshold.

When judged that the gravity direction and the optical axis direction are opposite to each other, that is, when the imaging direction has been oriented upward (YES at Step SA209), the control section 21 switches the normal imaging mode to the interval imaging mode whose base imaging mode is a still image mode, and sets imaging intervals therefor at a default value (initial value) (Step SA210).

Thereafter, until the re-establishment of the communication is detected (NO at Step SA212), that is, during the disconnection period, the control section 21 repeatedly performs still image capturing in the interval imaging mode (Steps SA213 to SA215).

At Step SA209, when judged that the gravity direction and the optical axis direction are not opposite to each other, that is, when the imaging direction has been oriented neither downward nor upward (NO at Step SA209), the control section 21 switches the normal imaging mode to the interval imaging mode whose base imaging mode is a moving image mode, and sets imaging intervals therefor at a default value (initial value) (Step SA211).

Thereafter, until the re-establishment of the communication is detected (NO at Step SA212), that is, during the disconnection period, the control section 21 repeatedly performs moving image capturing in the interval imaging mode (Steps SA213 to SA215).

Note that the processing from Steps SA213 to SA215 in this case is the same as the processing at Steps SA110 to SA112 shown in FIG. 4 in the first embodiment. Therefore, when the base imaging mode is a moving image mode as set at Step SA211, record timing to be judged at Step SA213 is frame timing during the moving image capturing that is intermittently performed at the default imaging intervals. Also, the processing thereafter is the same as that of the first embodiment.

At Step SA208, when judged that the gravity direction coincides with the optical axis direction at the time of the disconnection of the communication with the remote controller 2, that is, when the imaging direction has been oriented downward (YES at Step SA208), the control section 21 immediately performs stop processing and turns off the power supply (Step SA218) to end the entire processing of the normal imaging mode. Note that this stop processing is processing required to be performed before the power supply is turned off, and includes the generation of a moving image file in a case where moving image capturing is being performed.

As described above, when interference occurs in wireless remote control while normal imaging is being performed in the present embodiment, if the imaging direction has been oriented neither downward nor upward, that is, in a situation where an imaging target is highly likely to be changed, the control section 21 starts the interval imaging mode whose base imaging mode is a moving image mode. Also, when interference occurs in remote control, and the imaging direction has been oriented upward at that point, that is, in a situation where an imaging target is not likely to be changed, the control section 21 starts the interval imaging mode whose base imaging mode is a still image mode.

As a result of this configuration, even when interference occurs in wireless remote control, still images or moving images can be continuously recorded, as with the first embodiment. Thus, effects on image capturing when interference occurs in wireless remote control can be reduced. Also, by a base imaging mode for interval imaging being set in accordance with an imaging direction when interference occurs in remote control, efficient image capturing can be performed.

Moreover, in a situation where an imaging direction has been oriented downward when interference has occurred in wireless remote control, and still images or moving images are not required to be recorded, meaningless recording of still images or moving images can be avoided by the power supply being turned off, so that unnecessary power consumption by wasteful image capturing can be prevented.

Figure 8:
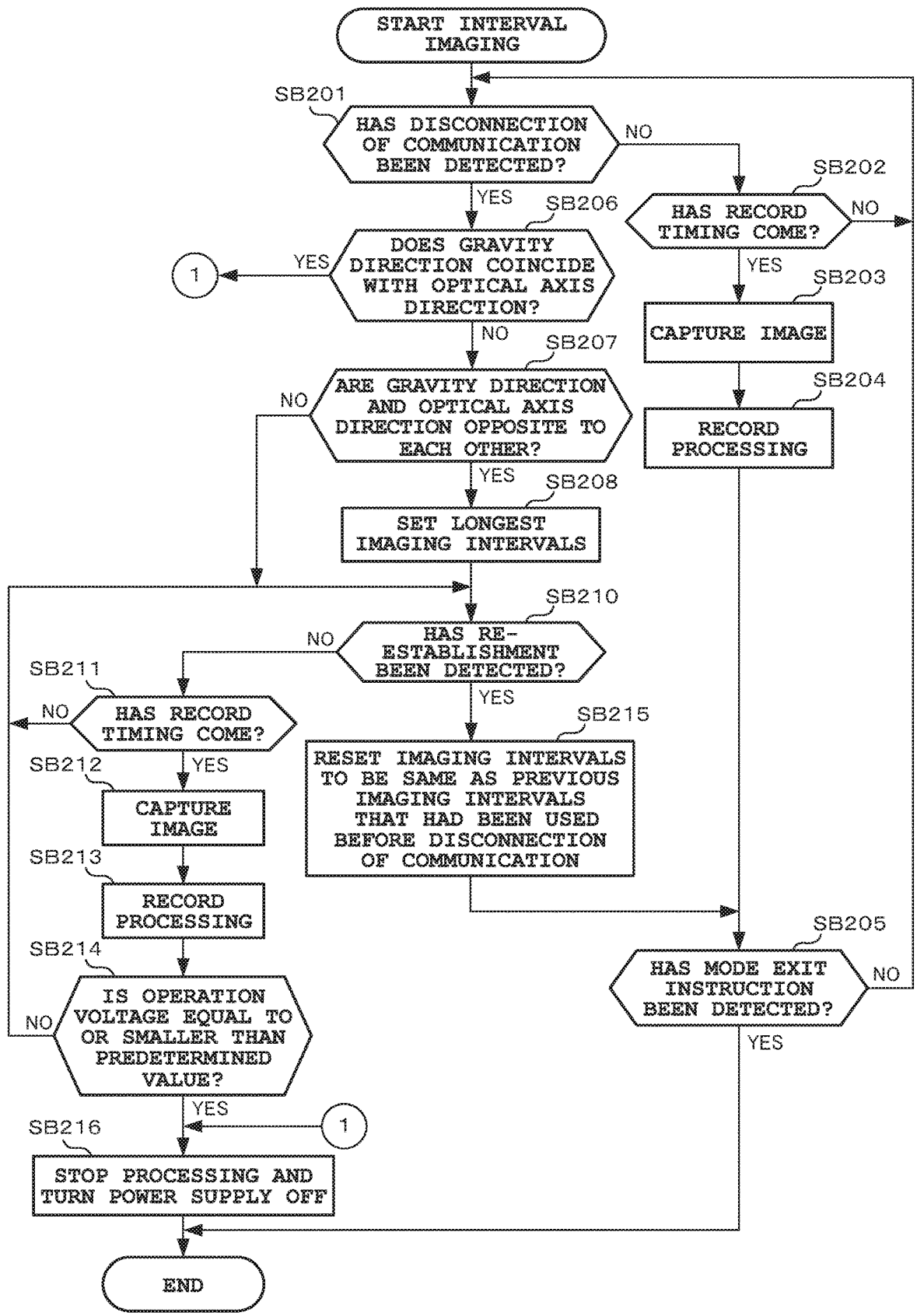
FIG. 8 is a flowchart for describing the operation of the digital camera in an interval imaging mode in the second embodiment.

Next, the processing by the control section 21 when the interval imaging mode is set by the user is described according to FIG. 8. Note that, as is obvious from the drawing, the basic processing is similar to that of the first embodiment shown in FIG. 5, and therefore explanations thereof are omitted. Here, only processing different from that of the first embodiment is mainly described.

In the present embodiment, after the interval imaging mode is set and the operation is started, when the disconnection of communication with the remote controller 2 is detected (YES at Step SB201), the control section 21 judges whether the gravity direction detected by the orientation detection section 17 coincides with the current optical axis direction (imaging direction) (Step SB206). In this processing, the control section 21 judges that the gravity direction coincides with the optical axis direction when the difference therebetween is equal to or smaller than a predetermined threshold.

Then, when judged that the gravity direction does not coincide with the optical axis direction (NO at Step SB206), the control section 21 further judges whether the gravity direction and the optical axis direction are opposite to each other (Step SB207). In this processing, the control section 21 judges that the directions are opposite to each other when the angular difference between the optical axis direction and the direction completely opposite to the gravity direction is equal to or smaller than a predetermined threshold.

Here, when judged that the gravity direction and the optical axis direction are opposite to each other, that is, when the imaging direction has been oriented upward (YES at Step SB207), the control section 21 sets the longest imaging intervals while maintaining the interval imaging mode (Step SB208). Also, when the gravity direction and the optical axis direction are not opposite to each other, that is, when the imaging direction has been oriented neither downward nor upward (NO at Step SB207), the control section 21 maintains the interval imaging mode and the current imaging intervals such that the settings remain the same as those before the disconnection of the communication with the remote controller 2.

Thereafter, until the re-establishment of the communication is detected (NO at Step SB210), that is, during the disconnection period, the control section 21 repeatedly performs still image capturing or moving image capturing in the interval imaging mode at the longest imaging intervals (Steps SB211 to SB213).

This processing is the same as that at Steps SB109 to SB111 shown in FIG. 5 in the first embodiment. However, record timing to be judged at Step SB211 is timing in accordance with the base imaging mode (still image mode or moving image mode). This record timing is also timing in accordance with the longest imaging intervals set at Step SB108 (when the imaging direction has been oriented upward) or the imaging intervals set before the communication with the remote controller 2 is disconnected (when the imaging direction has been oriented neither downward nor upward). Also, the processing thereafter is the same as that of the first embodiment.

At Step SB206, when judged that the gravity direction coincides with the optical axis direction at the time of the disconnection of the communication with the remote controller 2, that is, when the imaging direction has been oriented downward (YES at Step SB206), the control section 21 immediately performs stop processing and turns off the power supply (Step SB216) to end the processing of the interval imaging mode. Note that this stop processing is processing required to be performed before the power supply is turned off, and includes the generation of a moving image file in a case where moving image capturing is being performed.

As described above, when interference occurs in wireless remote control while interval imaging is being performed in the present embodiment, if the imaging direction has not been oriented downward at that point, the control section 21 automatically switches the current imaging interval to the longest settable imaging intervals, and then continues the interval imaging in the still image mode or the moving image mode at the longest imaging intervals. Thus, effects on image capturing when interference occurs in wireless remote control can be reduced, as with the first embodiment. In addition, a time period where still images or moving images are continuously recordable can be prolonged. Also, if an imaging direction has been oriented downward when interference occurs in wireless remote control, the power supply is turned off, so that unnecessary power consumption by wasteful image capturing can be prevented, as in the case of the normal image capturing.

Third Embodiment

Next, a third embodiment of the present invention is described. In the present embodiment, in the digital camera 1 shown in FIG. 1 and FIG. 2, a control table T3 shown in FIG. 9 has been stored in the program memory 14 in place of the above-described control table T1 of FIG. 3.

FIG. 9 is a conceptual diagram similar to that of FIG. 3. The control table T3 of the present embodiment is also a table indicating each relation between a set imaging mode when the digital camera 1 is wirelessly connected to the remote controller 2 and an imaging mode to which the set imaging mode is switched when communication with the remote controller 2 is disconnected, and their detailed operation contents. However, the imaging modes herein to which the set imaging modes are switched and their detailed operation contents are different from those of the first embodiment. Here, an imaging mode to which a set imaging mode is switched and its detailed operation content vary based on ambient brightness detected by the brightness detection section 19. That is, they vary based on whether the ambient brightness is smaller than a predetermined value or is equal to or larger than the predetermined value.

Figure 10:
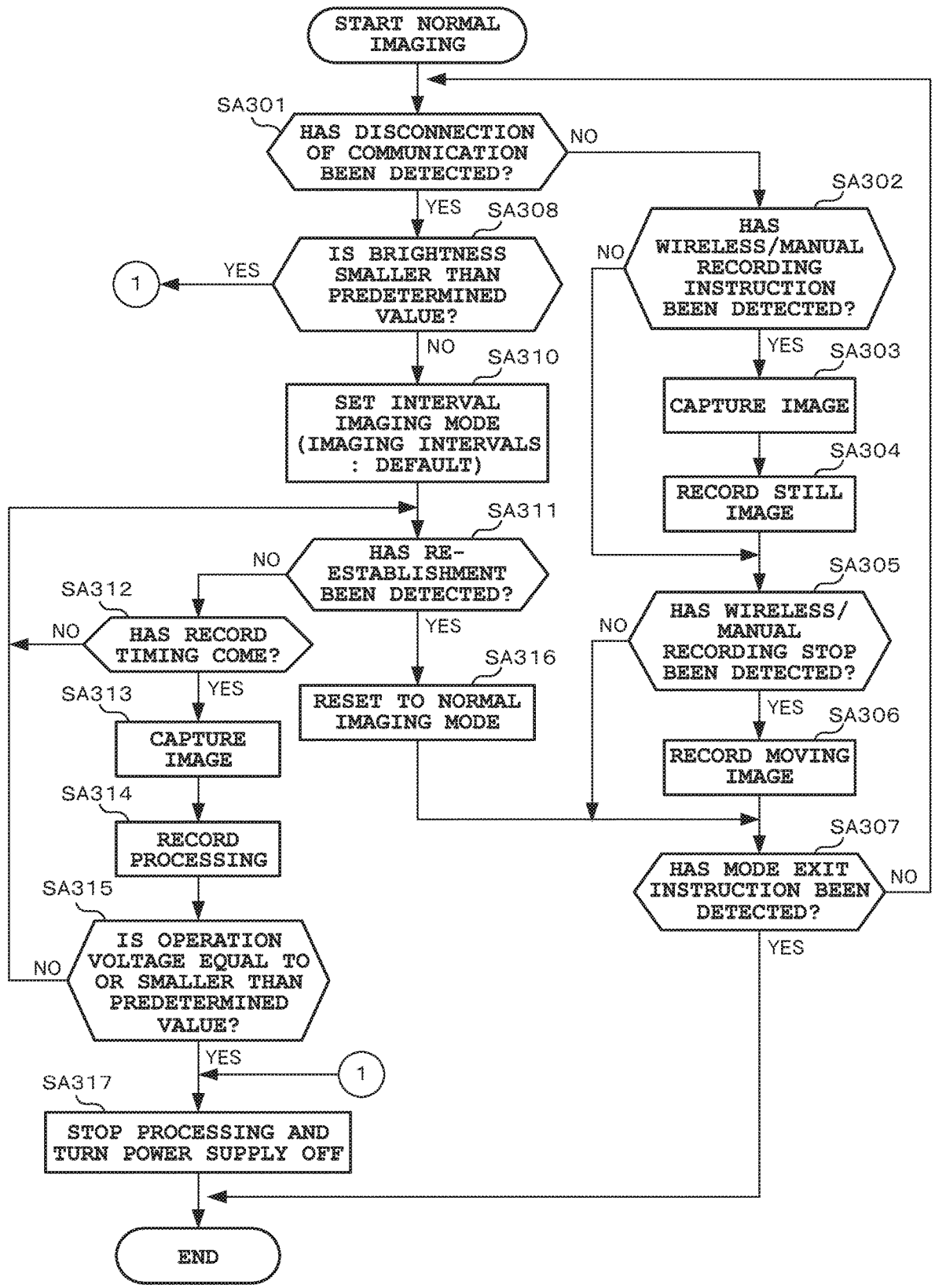
FIG. 10 is a flowchart for describing the operation of the digital camera in a normal imaging mode in the third embodiment.

In the present embodiment, when the normal imaging mode is set by the user after the power supply is turned ON and wireless connection with the remote controller 2 is established, the control section 21 performs processing shown in FIG. 10. When the interval imaging mode is set by the user, the control section 21 performs processing shown in FIG. 11. The third embodiment is different from the first embodiment in that, when communication with the remote controller 2 is disconnected, the control section 21 automatically switches the current imaging mode based on the ambient brightness of the digital camera 1.

First, the processing by the control section 21 when the normal imaging mode is set by the user is described according to FIG. 9. Note that, as with the second embodiment, the basic processing is similar to that of the first embodiment shown in FIG. 4, and therefore explanations thereof are omitted. Here, only processing different from that of the first embodiment is mainly described.

In the present embodiment, after the normal imaging mode is set and the operation is started, when the disconnection of communication with the remote controller 2 is detected (YES at Step SA301), the control section 21 judges whether ambient brightness detected by the brightness detection section 19 is smaller than a predetermined value (Step SA308). The predetermined value herein is a threshold value that serves as a judgment criterion as to, for example, whether the front of the digital camera 1 has been blocked by some obstacle such as a person, and is a reference value set in advance.

When the ambient brightness is not smaller than the predetermined value, that is, the ambient brightness is equal to or larger than the predetermined value, and no obstacle is judged to be present in front of the digital camera 1 (NO at Step SA308), the control section 21 automatically switches the normal imaging mode to the interval imaging mode while maintaining the base imaging mode, and sets imaging intervals therefor at a default value (Step SA310). Note that the default value herein is an initial value set in advance for the interval imaging mode.

Thereafter, until the re-establishment of the communication is detected (NO at Step SA311), that is, during the disconnection period, the control section 21 repeatedly performs image capturing in the interval imaging mode (Steps SA312 to SA314).

This processing is the same as that at Step SA110 to Step SA112 shown in FIG. 4 in the first embodiment. However, record timing to be judged at Step SA312 is, when the base imaging mode is a still image mode, a corresponding default imaging interval. When the base imaging mode is a moving image mode, this record timing is frame timing during moving image capturing that is intermittently performed at corresponding default imaging intervals. Also, the processing thereafter is the same as that of the first embodiment.

At Step SA308, when judged that the ambient brightness is smaller than the predetermined value at the time of the disconnection of the communication with the remote controller 2, that is, when judged that the front of the digital camera 1 has been blocked by some obstacle (YES at Step SA308), the control section 21 immediately performs stop processing and turns off the power supply (Step SA317) to end the processing of the normal imaging mode. Note that this stop processing is processing required to be performed before the power supply is turned off, and includes the generation of a moving image file in a case where moving image capturing is being performed.

As described above, when interference occurs in wireless remote control while normal imaging is being performed in the present embodiment, if a judgment is made that no obstacle is present in front of the digital camera 1, the control section 21 starts the interval imaging mode while maintaining a base imaging mode.

As a result of this configuration, even when interference occurs in wireless remote control, still images or moving images can be continuously recorded, as with the first embodiment. Thus, effects on image capturing when interference occurs in wireless remote control can be reduced. Also, when interference occurs in wireless remote control and the front of the digital camera 1 is judged to have been blocked by an obstacle, the power supply is turned off, so that still images or moving images are not unnecessarily recorded, and unnecessary power consumption by wasteful image capturing can be prevented.

Figure 11:
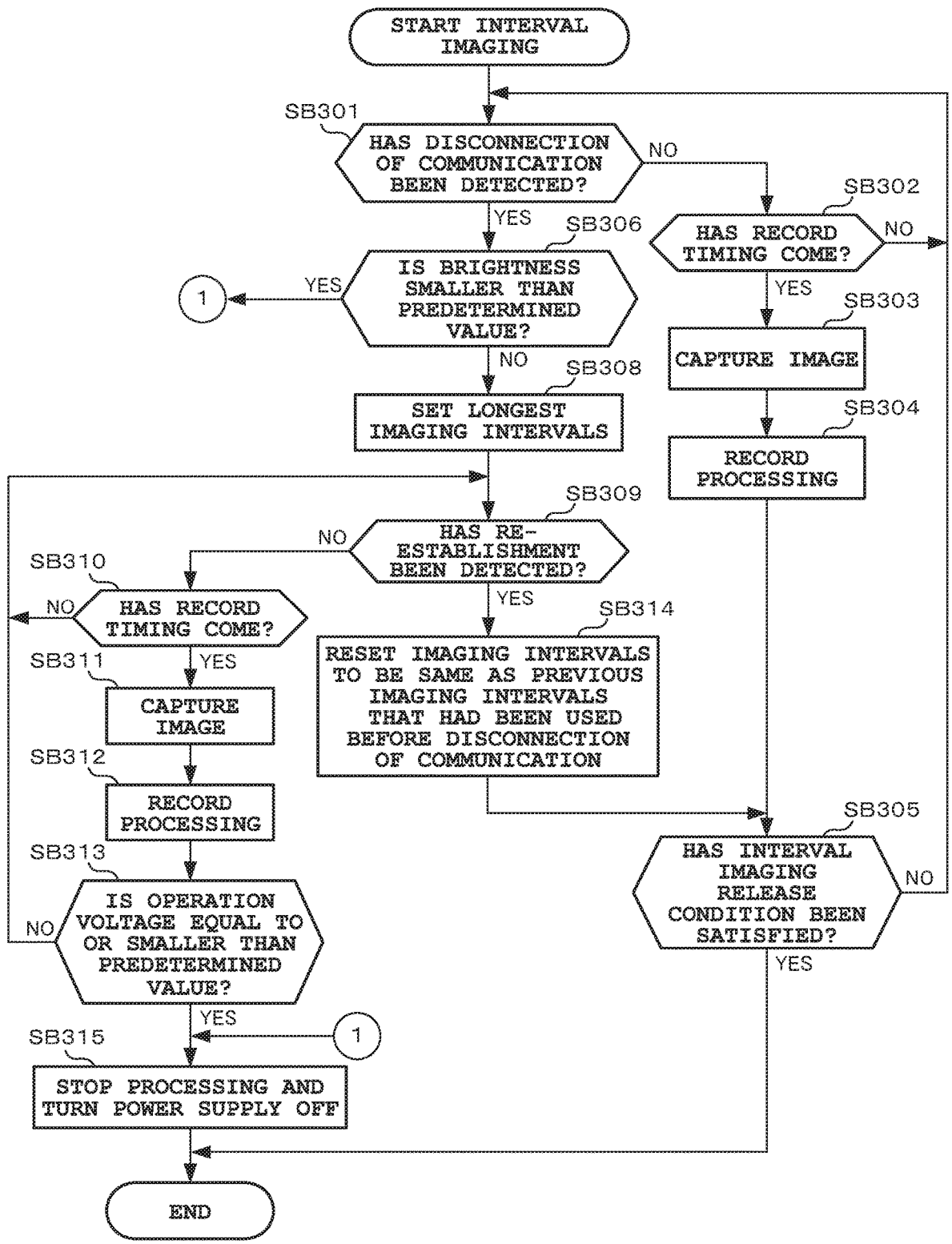
FIG. 11 is a flowchart for describing the operation of the digital camera in an interval imaging mode in the third embodiment.

Next, the processing by the control section 21 when the interval imaging mode is set by the user is described according to FIG. 11. Note that, as with the second embodiment, the basic processing is similar to that of the first embodiment shown in FIG. 5, and therefore explanations thereof are omitted. Here, only processing different from that of the first embodiment is mainly described.

In the present embodiment, after the interval imaging mode is set and the operation is started, when the disconnection of communication with the remote controller 2 is detected (YES at Step SB301), the control section 21 judges whether ambient brightness detected by the brightness detection section 19 is smaller than a predetermined value (Step SB308).

When the ambient brightness is not smaller than the predetermined value (NO at Step SB308), the control section 21 sets the longest imaging intervals while maintaining the set interval imaging (Step SB309).

Thereafter, until the re-establishment of the communication is detected (NO at Step SB309), that is, during the disconnection period, the control section 21 repeatedly performs still image capturing or moving image capturing in the interval imaging mode at the longest imaging intervals (Steps SB310 to SB312).

This processing is the same as that at Steps SB109 to SB111 shown in FIG. 5 in the first embodiment. However, record timing to be judged at Step SB310 is timing in accordance with the base imaging mode (still image mode or moving image mode).

At Step SA308, when the ambient brightness is smaller than the predetermined value at the time of the disconnection of the communication with the remote controller 2, and the front of the digital camera 1 is judged to have been blocked by some obstacle (NO at Step SA308), the control section 21 immediately performs stop processing and turns off the power supply (Step SA317) to end the processing of the normal imaging mode. Note that this stop processing is processing required to be performed before the power supply is turned off, and includes the generation of a moving image file in a case where moving image capturing is being performed.

As described above, when interference occurs in wireless remote control while interval imaging is being performed in the present embodiment, if a judgment is made that no obstacle is present in front of the digital camera 1, the control section 21 automatically switches the current imaging intervals to the longest settable imaging intervals, and then continues the interval imaging in the still image mode or the moving image mode at the longest imaging intervals. Thus, effects on image capturing when interference occurs in wireless remote control can be reduced, as with the first embodiment. In addition, a time period where still images or moving images are continuously recordable can be prolonged. Also, when interference occurs in wireless remote control and the front of the digital camera 1 is judged to have been blocked by an obstacle, the power supply is turned off, so that unnecessary power consumption by wasteful image capturing can be prevented, as in the case of the normal image capturing.

Fourth Embodiment

Next, a fourth embodiment of the present invention is described. In the present embodiment, in the digital camera 1 shown in FIG. 1 and FIG. 2, a control table T4 shown in FIG. 12 has been stored in the program memory 14 in place of the above-described control table T1 of FIG. 3. Also, the digital camera 1 of this embodiment has a blur correction function. This blur correction function is a function of correcting blurring in still images or subject shake in moving images due to camera shake during image capturing, based on accelerations in triaxial directions detected by the movement detection section 18. This function is a known technique of an electronic or optical type.

FIG. 12 is a conceptual diagram similar to that of FIG. 3. The control table T4 of the present embodiment is also a table indicating each relation between a set imaging mode when the digital camera 1 is wirelessly connected to the remote controller 2 and an imaging mode to which the set imaging mode is switched when communication with the remote controller 2 is disconnected, and their detailed operation contents. However, the imaging modes herein to which the set imaging modes are switched and their detailed operation contents are different from those of the first embodiment. Here, an imaging mode to which a set imaging mode is switched and its detailed operation content vary based on acceleration detected by the movement detection section 18. That is, they vary based on whether the acceleration is smaller than a predetermined value or is equal to or larger than the predetermined value. Also, the detailed operation contents indicate imaging intervals and blur correction levels. The blur correction levels herein are effectiveness levels of blur correction by the blur correction function.

Figure 13:
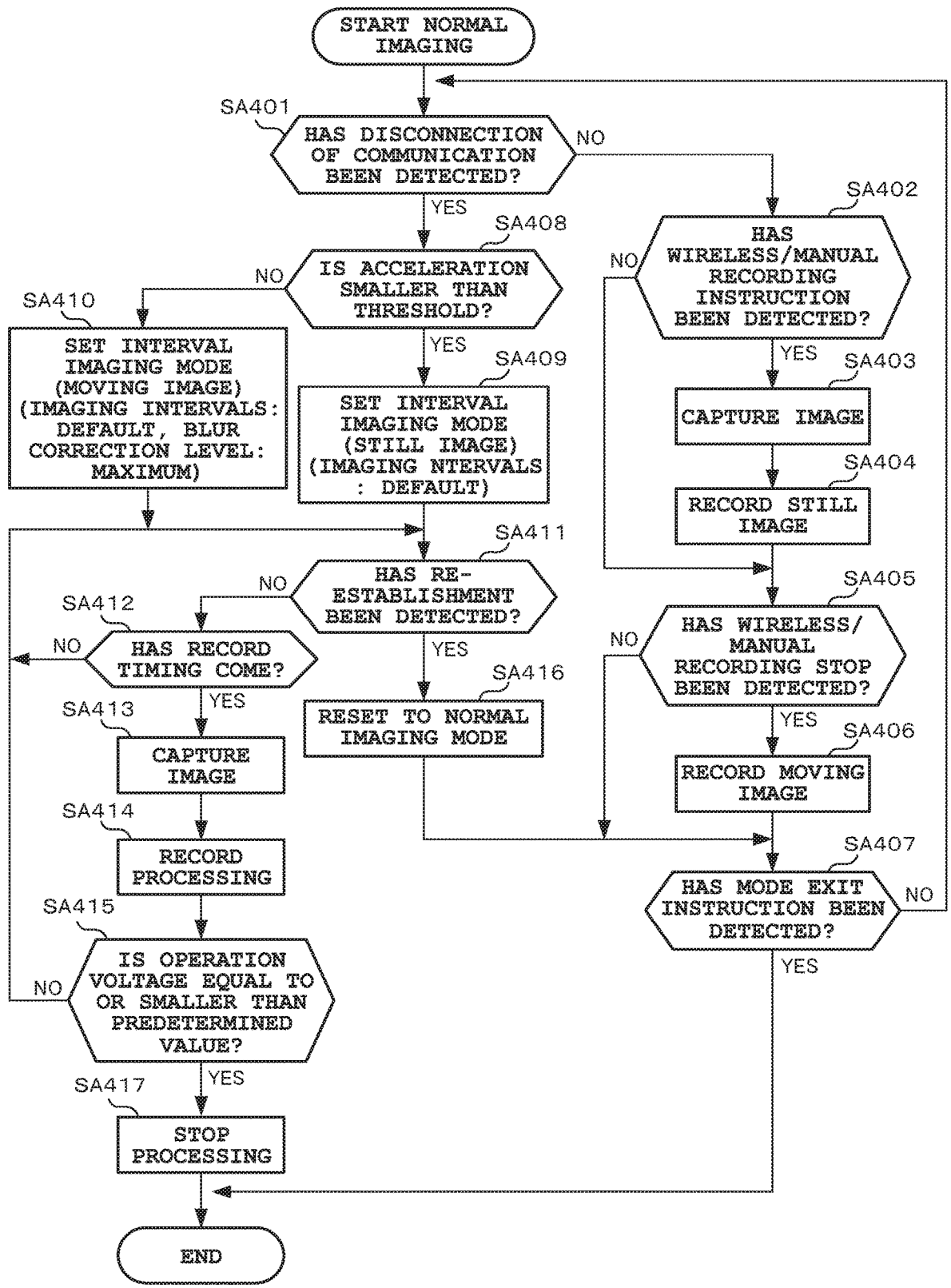
FIG. 13 is a flowchart for describing the operation of the digital camera in a normal imaging mode in the fourth embodiment.

In the present embodiment, when the normal imaging mode is set by the user after the power supply is turned ON and wireless connection with the remote controller 2 is established, the control section 21 performs processing shown in FIG. 13. When the interval imaging mode is set by the user, the control section 21 performs processing shown in FIG. 14. The fourth embodiment is different from the first embodiment in that, when communication with the remote controller 2 is disconnected, the control section 21 automatically switches the current imaging mode based on the movement degree of the digital camera 1.

First, the processing by the control section 21 when the normal imaging mode is set by the user is described according to FIG. 13. Note that, as with the second embodiment, the basic processing is similar to that of the first embodiment shown in FIG. 4, and therefore explanations thereof are omitted. Here, only processing different from that of the first embodiment is mainly described.

In the present embodiment, after the normal imaging mode is set and the operation is started, when the disconnection of communication with the remote controller 2 is detected (YES at Step SA401), the control section 21 judges whether acceleration detected by the movement detection section 18 is smaller than a predetermined value (Step SA408). The predetermined value herein is a reference value set in advance for judging the movement degree of the digital camera 1.

Then, when the acceleration is smaller than the predetermined value, that is, the movement of the digital camera 1 is relatively small (YES at Step SA408), the control section 21 switches the normal imaging mode to the interval imaging mode whose base imaging mode is a still image mode, and sets imaging intervals therefor at a default value (initial value) (Step SA409).

Thereafter, until the re-establishment of the communication is detected (NO at Step SA411), that is, during the disconnection period, the control section 21 repeatedly performs still image capturing in the interval imaging mode (Steps SA412 to SA414).

At Step SA408, when judged that the acceleration is not smaller than the predetermined value, that is, when the acceleration is equal to or larger than the predetermined value and the movement of the digital camera 1 is relatively large (NO at Step SA408), the control section 21 performs the following processing. That is, the control section 21 switches the normal imaging mode to the interval imaging mode whose base imaging mode is a moving image mode, sets imaging intervals therefor at a default value (initial value), and sets the blur correction level to maximum (Step SA410).

Thereafter, until the re-establishment of the communication is detected (NO at Step SA411), that is, during the disconnection period, the control section 21 repeatedly performs moving image capturing in the interval imaging mode (Steps SA412 to SA414).

The processing from Steps SA412 to SA414 in this case is the same as that at Steps SA110 to SA112 shown in FIG. 4 in the first embodiment, and record timing to be judged at Step SA412 is frame timing during the moving image capturing that is intermittently performed at the default imaging intervals in the moving image mode. Also, the processing thereafter is the same as that of the first embodiment.

As described above, when interference occurs in wireless remote control while normal imaging is being performed in the present embodiment, if a judgment is made that the movement of the digital camera 1 is relatively small, the control section 21 starts the interval imaging mode whose base imaging mode is a still image mode. Also, when interference occurs in wireless remote control and a judgment is made that the movement of the digital camera 1 is relatively large, the control section 21 starts the interval imaging mode whose base imaging mode is a moving image mode.

As a result of this configuration, even when interference occurs in wireless remote control, still images or moving images can be continuously recorded, as with the first embodiment. Thus, effects on image capturing when interference occurs in wireless remote control can be reduced.

In addition, by a base imaging mode for interval imaging being set in accordance with the movement degree of the digital camera 1 which is acquired when interference occurs in remote control, more appropriate image capturing can be performed during the disconnection period. That is, when the movement is small, the imaging range is assumed to be not much changed during the disconnection period, and therefore the number of times of image capturing can be minimized by interval imaging for still images being performed. Conversely, when the movement is large, the imaging range is assumed to be significantly changed during the disconnection period. Accordingly, by interval imaging for moving images being performed, reliable image capturing can be performed. In this case, by the blur correction level being set to maximum, high-quality moving images can be recorded.

Figure 14:
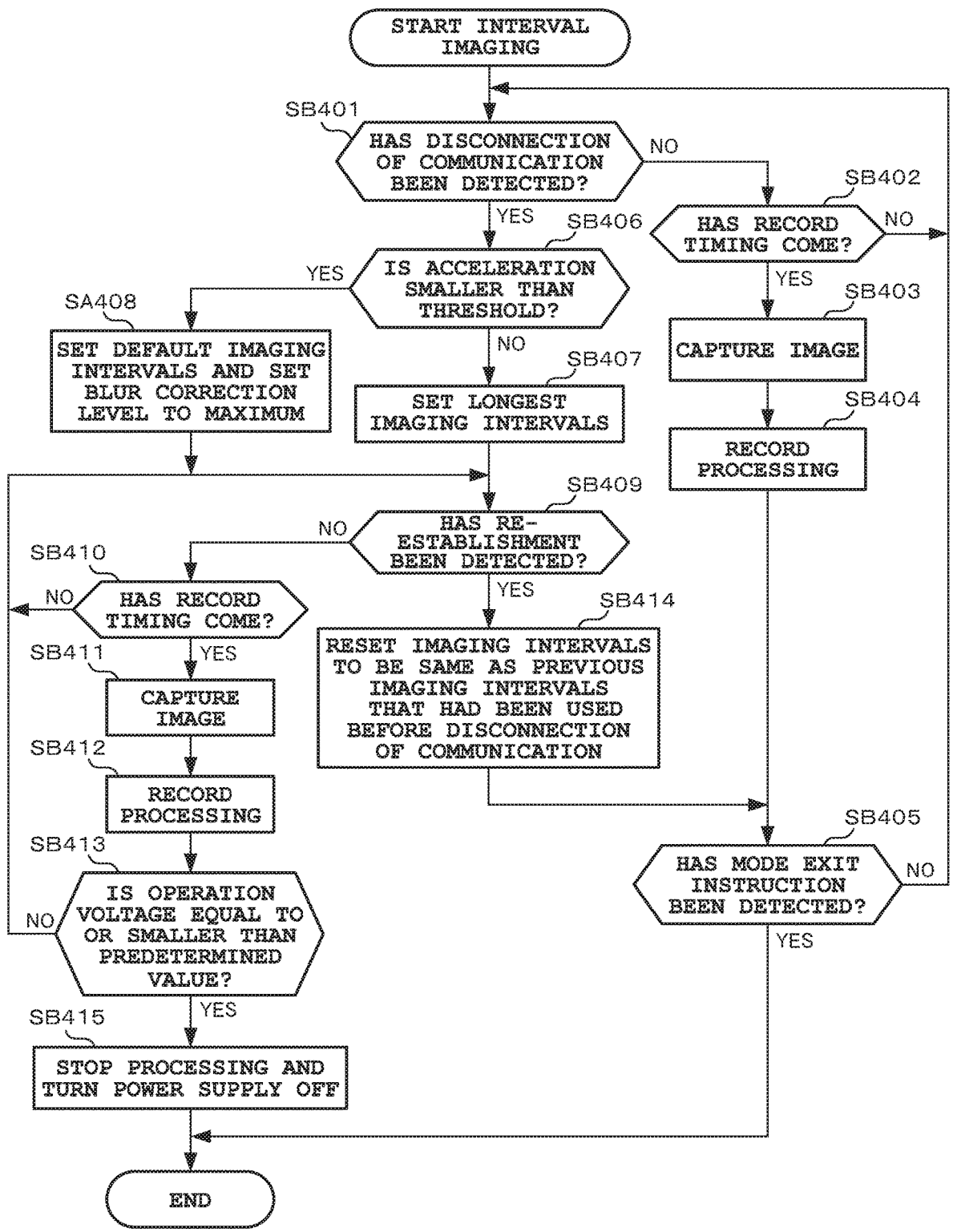
FIG. 14 is a flowchart for describing the operation of the digital camera in an interval imaging mode in the fourth embodiment.

Next, the processing by the control section 21 when the interval imaging mode is set by the user is described according to FIG. 14. Note that, as is obvious from the drawing, the basic processing is similar to that of the first embodiment shown in FIG. 5, and therefore explanations thereof are omitted. Here, only processing different from that of the first embodiment is mainly described.

In the present embodiment, after the interval imaging mode is set and the operation is started, when the disconnection of communication with the remote controller 2 is detected (YES at Step SB401), the control section 21 judges whether acceleration detected by the movement detection section 18 is smaller than a predetermined value (Step SB406).

When the acceleration is smaller than the predetermined value and the movement of the digital camera 1 is relatively small (YES at Step SB406), the control section 21 sets the longest imaging intervals while maintaining the interval imaging mode (Step SB407).

Thereafter, until the re-establishment of the communication is detected (NO at Step SB409), that is, during the disconnection period, the control section 21 repeatedly performs still image capturing or moving image capturing in the interval imaging mode (Steps SB410 to SB412).

This processing is the same as that at Steps SB109 to SB111 shown in FIG. 5 in the first embodiment. However, record timing to be at Step SB410 is timing in accordance with the interval imaging mode. In addition, this record timing is timing corresponding to the longest imaging intervals set at Step SB407. Also, the processing thereafter is the same as that of the first embodiment.

At Step SB406, if the acceleration when the communication with the remote controller 2 is disconnected is equal to or larger than the predetermined value, and a judgment is made that the movement of the digital camera 1 is relatively large (NO at Step SB406), the control section 21 performs the following processing. That is, the control section 21 sets default imaging intervals (initial value) and sets the blur correction level to maximum (Step SB408).

Thereafter, until the re-establishment of the communication is detected (NO at Step SB409), that is, during the disconnection period, the control section 21 repeatedly performs still image capturing or moving image capturing in the interval imaging mode (Steps SB410 to SB412). The processing thereafter is the same as that of the first embodiment.

As described above, when interference occurs in wireless remote control while interval imaging is being performed in the present embodiment, if a judgment is made that the movement of the digital camera 1 is relatively small, the control section 21 automatically switches the current imaging intervals to the longest settable Imaging intervals, and then continues the interval imaging in the still image mode or the moving image mode at the longest imaging intervals. Thus, effects on image capturing when interference occurs in wireless remote control can be reduced, as with the first embodiment. In addition, a time period where still images or moving images are continuously recordable can be prolonged.

Also, when interference occurs in wireless remote control and the movement of the digital camera 1 is judged to be relatively large at that point, the blur correction level is set to maximum with the base imaging mode being maintained, so that high-quality moving images can be recorded.

Here, in the above-described third embodiment, when communication with the remote controller 2 is disconnected during an operation in the normal imaging mode, and ambient brightness detected by the brightness detection section 19 is equal to or larger than the predetermined value, the interval imaging mode is automatically set with the base imaging mode being maintained, and imaging intervals therefor are set at a default value.

However, for example, a configuration different therefrom may be adopted in which, when the ambient brightness is equal to or larger than the predetermined value, whether the gravity direction detected by the orientation detection section 17 coincides with an optical axis direction (imaging direction) is judged as in the second embodiment, and an imaging mode and a detailed operation content are set in accordance with the judgment result based on the control table T2 shown in FIG. 6. Alternatively, a configuration may be adopted in which, when the ambient brightness is equal to or larger than the predetermined value, whether acceleration detected by the movement detection section 18 is smaller than the predetermined value is judged as in the fourth embodiment, and an imaging mode and a detailed operation content are set in accordance with the judgment result based on the control table T4 shown in FIG. 12.

While the present invention has been described with reference to the preferred embodiments, it is intended that the invention be not limited by any of the details of the description therein but includes all the embodiments which fall within the scope of the appended claims.

What is claimed is:

1. An imaging apparatus comprising:
   an imaging section; and
   a controller which, by executing a stored program, performs processes comprising:
   a judgment process which judges whether control over the imaging section by receiving a wireless control signal from a remote control device has been maintained; and
   a control process which, while a first imaging mode is set as an imaging mode for image capturing by the imaging section, controls to switch the first imaging mode to a second imaging mode different from the first imaging mode in response to a judgment made in the judgment process that the control over the imaging section has not been maintained;
   wherein the first imaging mode is an imaging mode for recording an image captured by the imaging section in accordance with an imaging instruction from the remote control device, and
   wherein the second imaging mode is an imaging mode for recording an image automatically captured by the imaging section at a predetermined timing without any imaging instruction.

2. The imaging apparatus according to claim 1, wherein the controller, by executing the stored program, further performs a status acquisition process which acquires a status of a wireless connection with the remote control device, and wherein the judgment process judges that the control over the imaging section has not been maintained when a disconnected state is acquired in the status acquisition process as the status of the wireless connection with the remote control device.

3. The imaging apparatus according to claim 1, wherein the second imaging mode is an imaging mode where power consumption is suppressed as compared with the first imaging mode.

4. The imaging apparatus according to claim 1, wherein the controller, by executing the stored program, further performs a direction judgment process which judges an imaging direction of the imaging section with reference to a gravity direction, and sets an imaging mode based on a result of a judgment made in the direction judgment process as the second imaging mode, in response to the judgment made in the judgment process that the control over the imaging section has not been maintained.

5. The imaging apparatus according to claim 4, wherein the controller, by executing the stored program, further performs control to turn off a power supply based on a result of a judgment made in the direction judgment process, in response to the judgment made in the judgment process that the control over the imaging section has not been maintained.

6. The imaging apparatus according to claim 5, wherein the controller, by executing the stored program, further performs a re-establishment judgment process which judges whether a wireless connection with the remote control device has been re-established after the power supply is turned off, and sets the first imaging mode when the re-establishment judgment process judges that the wireless connection with the remote control device has been re-established.

7. The imaging apparatus according to claim 1, wherein the controller, by executing the stored program, further performs a brightness judgment process which judges a brightness in an imaging environment, and sets an imaging mode based on a result of a judgment made in the brightness judgment process, as the second imaging mode.

8. The imaging apparatus according to claim 7, wherein the controller, by executing the stored program, further performs control to turn off a power supply based on a result of a judgment made in the brightness judgment process, in response to the judgment made in the judgment process that the control over the imaging section has not been maintained.

9. The imaging apparatus according to claim 8, wherein the controller, by executing the stored program, further performs a re-establishment judgment process which judges whether a wireless connection with the remote control device has been re-established after the power supply is turned off, and sets the first imaging mode when the re-establishment judgment process judges that the wireless connection with the remote control device has been re-established.

10. The imaging apparatus according to claim 1, wherein the controller, by executing the stored program, further performs a movement judgment process which judges whether the imaging apparatus has been moved, and sets an imaging mode based on a result of a judgment made in the movement judgment process, as the second imaging mode.

11. An imaging apparatus comprising:
an imaging section; and
a controller which, by executing a stored program, performs processes comprising:
a judgment process which judges whether control over the imaging section by receiving a wireless control signal from a remote control device has been maintained; and
a control process which, while a first imaging mode is set as an imaging mode for image capturing by the imaging section, controls to switch the first imaging mode to a second imaging mode different from the first imaging mode in response to a judgment made in the judgment process that the control over the imaging section has not been maintained;
wherein the first imaging mode is an imaging mode for recording images captured by the imaging section at predetermined time intervals, and
wherein the second imaging mode is an imaging mode for recording images captured by the imaging section at time intervals longer than the predetermined time intervals.

12. An imaging mode control method of an imaging apparatus having an imaging section, the method comprising:
judging whether control over the imaging section by receiving a wireless control signal from a remote control device has been maintained; and
while a first imaging mode is set as an imaging mode for image capturing by the imaging section, controlling to switch the first imaging mode to a second imaging mode different from the first imaging mode, in response to a judgment that the control over the imaging section has not been maintained;
wherein the first imaging mode is an imaging mode for recording an image captured by the imaging section in accordance with an imaging instruction from the remote control device, and
wherein the second imaging mode is an imaging mode for recording an image automatically captured by the imaging section at a predetermined timing without any imaging instruction.

13. A non-transitory computer-readable storage medium having a program stored thereon that is executable by a computer in an imaging apparatus having an imaging section to actualize functions comprising:
judgment processing for judging whether control over the imaging section by receiving a wireless control signal from a remote control device has been maintained; and
control processing for while a first imaging mode is set as an imaging mode for image capturing by the imaging section, controlling to switch the first imaging mode to a second imaging mode different from the first imaging mode, in response to a judgment made in the judgment processing that the control over the imaging section has not been maintained;
wherein the first imaging mode is an imaging mode for recording an image captured by the imaging section in accordance with an imaging instruction from the remote control device, and
wherein the second imaging mode is an imaging mode for recording an image automatically captured by the imaging section at a predetermined timing without any imaging instruction.

14. An imaging mode control method of an imaging apparatus having an imaging section, the method comprising:

judging whether control over the imaging section by receiving a wireless control signal from a remote control device has been maintained; and while a first imaging mode is set as an imaging mode for image capturing by the imaging section, controlling to switch the first imaging mode to a second imaging mode different from the first imaging mode, in response to a judgment that the control over the imaging section has not been maintained;

wherein the first imaging mode is an imaging mode for recording images captured by the imaging section at predetermined time intervals, and wherein the second imaging mode is an imaging mode for recording images captured by the imaging section at time intervals longer than the predetermined time intervals.

15. A non-transitory computer-readable storage medium having a program stored thereon that is executable by a computer in an imaging apparatus having an imaging section to actualize functions comprising:

judgment processing for judging whether control over the imaging section by receiving a wireless control signal from a remote control device has been maintained; and control processing for while a first imaging mode is set as an imaging mode for image capturing by the imaging section, controlling to switch the first imaging mode to a second imaging mode different from the first imaging mode, in response to a judgment made in the judgment processing that the control over the imaging section has not been maintained;

wherein the first imaging mode is an imaging mode for recording images captured by the imaging section at predetermined time intervals, and wherein the second imaging mode is an imaging mode for recording images captured by the imaging section at time intervals longer than the predetermined time intervals.

* * * * *